United States Patent
Leng

(10) Patent No.: US 11,071,392 B2
(45) Date of Patent: Jul. 27, 2021

(54) STRUCTURE FOR CONNECTING A STAND POLE AND A BEAM OF A BUNK BED AND A BUNK BED USING THE STRUCTURE

(71) Applicant: NEW-TEC INTEGRATION (XIAMEN) CO., LTD., Fujian (CN)

(72) Inventor: Luhao Leng, Fujian (CN)

(73) Assignee: NEW-TEC INTEGRATION (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/781,946

(22) PCT Filed: Feb. 23, 2017

(86) PCT No.: PCT/CN2016/111390
§ 371 (c)(1),
(2) Date: Jun. 6, 2018

(87) PCT Pub. No.: WO2017/107935
PCT Pub. Date: Jun. 29, 2017

(65) Prior Publication Data
US 2018/0360225 A1    Dec. 20, 2018

(30) Foreign Application Priority Data

Dec. 25, 2015    (CN) .......................... 201510995338.X

(51) Int. Cl.
*A47C 19/02*    (2006.01)
*A47C 19/00*    (2006.01)
(Continued)

(52) U.S. Cl.
CPC .......... *A47C 19/028* (2013.01); *A47C 19/005* (2013.01); *A47C 19/20* (2013.01); *A47C 19/202* (2013.01); *F16B 12/54* (2013.01)

(58) Field of Classification Search
CPC .......... F16B 12/32; F16B 12/40; F16B 12/42; F16B 12/44; F16B 12/48; F16B 12/54;
(Continued)

(56) References Cited

U.S. PATENT DOCUMENTS 4,989,519 A * 2/1991 Welsch ................. A47B 47/04
108/192
6,123,035 A * 9/2000 Pfister ................ A47B 87/0223
108/147.13
(Continued)

FOREIGN PATENT DOCUMENTS

CN    2062572 U    9/1990
CN    2596868 Y    1/2004
(Continued)

*Primary Examiner* — Nicholas F Polito
*Assistant Examiner* — Alison N Labarge
(74) *Attorney, Agent, or Firm* — Cooper Legal Group, LLC

(57) ABSTRACT

A structure for connecting a post and a beam of a bunk bed includes a support tube located above the beam. A connection tube is located below the beam. An end portion of the beam is provided with an insertion connection portion connecting the support tube and the connection tube. The insertion connection portion and the support tube have a pair of slanted surfaces disposed opposite to each other. When the support tube and the insertion connection portion are connected by insertion, the slanted surface of the insertion connection portion tightly fits the slanted surface of the support tube. The insertion connection portion and the connection tube have a pair of slanted surfaces disposed opposite to each other. When the connection tube and the insertion connection portion are connected by insertion, the slanted surface of the insertion connection portion tightly fits the slanted surface of the connection tube.

16 Claims, 12 Drawing Sheets

(51) Int. Cl.
*A47C 19/20* (2006.01)
*F16B 12/54* (2006.01)

(58) Field of Classification Search
CPC ............... F16B 12/58; F16B 2012/443; F16B 2012/446; F16B 2012/463; F16B 2012/466; A47C 19/005; A47C 19/028; A47C 19/20; A47C 19/202; A47C 19/021; A47C 19/025; A47C 19/02
See application file for complete search history.

(56) References Cited

U.S. PATENT DOCUMENTS

| | | | |
|---|---|---|---|
| 7,028,957 B1 * | 4/2006 | Larson ..................... | A47B 9/10 108/147 |
| 7,111,341 B2 * | 9/2006 | Hennings ............... | A47C 19/00 5/2.1 |
| 2003/0041375 A1 * | 3/2003 | Rosenquist .......... | A47C 19/005 5/9.1 |

FOREIGN PATENT DOCUMENTS

| | | |
|---|---|---|
| CN | 2720916 Y | 8/2005 |
| CN | 203407794 U | 1/2014 |
| CN | 203914154 U | 11/2014 |
| CN | 105768678 A | 7/2016 |
| CN | 205410513 U | 8/2016 |
| EP | 2196112 A1 | 6/2010 |

* cited by examiner

STRUCTURE FOR CONNECTING A STAND POLE AND A BEAM OF A BUNK BED AND A BUNK BED USING THE STRUCTURE

TECHNICAL FIELD

The present invention relates to a structure for connecting a stand pole and a beam of a bunk bed and a bunk bed using the structure, in particularly to a structure for connecting a stand pole and a beam of a bunk bed which is easily detached, and a bunk bed using the structure.

BACKGROUND OF THE INVENTION

A bedstead is formed by a plurality of cross bars and vertical bars, and the matching bolt holes are arranged between the cross bars and the vertical bars, then bolts are inserted into the bolt holes to lock and fix the cross bars and the vertical bars. The disassembly of the bedstead requires frequent locking bolts and loose bolts, so the disassembly is troublesome and inefficient.

Moreover, the bunk bedstead in addition to including the lower bed beam, the lower bed guardrail, also need to set the upper bed beam, the upper bed guardrail, the middle connection tubes connected to the upper bed beam and the lower bed beam. It requires a large number of components.

In general, the components that cooperate with each other are locked with a bolt. Installation is more time-consuming and laborious, and need to use specialized installation tools, it is very troublesome.

SUMMARY OF THE INVENTION

The present invention provides a structure for connecting a stand pole and a beam of a bunk bed and bunk bed using the structure, which overcomes the shortcomings of the background art, and uses the structure to quickly assemble a bunk bed without or less use of screws. The technical solution adopted by the present invention to solve the technical problem is as follows:

A structure for connecting a stand pole and a beam of a bunk bed, the stand pole comprises a support tube and a connection tube, the support tube is located above the beam and the connection tube is located below the beam. An end portion of the beam is disposed with an insertion connection portion used to connect the support tube and the connection tube;

The insertion connection portion and the support tube have a pair of slanted surfaces disposed opposite to each other. When the support tube and the insertion connection portion are connected by insertion, the slanted surface of the insertion connection portion tightly fits the slanted surface of the support tube;

The insertion connection portion and the connection tube have a pair of slanted surfaces disposed opposite to each other. When the connection tube and the insertion connection portion are connected by insertion, the slanted surface of the insertion connection portion tightly fits the slanted surface of the connection tube.

In a preferred embodiment: the slanted surface is a conical or pyramidal surface.

In a preferred embodiment: the insertion connection portion and the support tube have a pair of slanted surfaces disposed opposite to each other, the structure of which is as follows: a slanted surface is disposed at the lower end of the support tube to form a conical plug, the other slanted surface is disposed at the upper portion of the insertion connection portion to form a tapered hole; or a slanted surface is disposed at the lower end of the support tube to form a tapered hole, the other slanted surface is disposed at the upper portion of the insertion connection portion to form a conical plug.

In a preferred embodiment: the insertion connection portion and the connection tube have a pair of slanted surfaces disposed opposite to each other: a slanted surface is disposed at the upper end of the connection tube to form a conical plug, the other slanted surface is disposed at the lower portion of the insertion connection portion to form a tapered hole; or a slanted surface is disposed at the upper end of the connection tube to form a tapered hole, the other slanted surface is disposed at the lower portion of the insertion connection portion to form a conical plug.

In a preferred embodiment: the support tube, the insertion connection portion and the connection tube are aligned on a straight line.

A bunk bed comprises a stand pole and two beams, the stand pole comprises a connection tube and two support tubes, the two beams are set up and down in parallel, a support tube is located above the upper beam and the other support tube is located below the lower beam. The connection tube is located between two beams. An end portion of the beam is disposed with an insertion connection portion used to connect the support tube and the connection tube;

The insertion connection portion and the support tube have a pair of slanted surfaces disposed opposite to each other. When the support tube and the insertion connection portion are connected by insertion, the slanted surface of the insertion connection portion tightly fits the slanted surface of the support tube;

The insertion connection portion and the connection tube have a pair of slanted surfaces disposed opposite to each other. When the connection tube and the insertion connection portion are connected by insertion, the slanted surface of the insertion connection portion tightly fits the slanted surface of the connection tube.

Compared with the background art, this technical solution has the following advantages:

1. The insertion connection portion and the support tube have a pair of slanted surfaces disposed opposite to each other. When the support tube and the insertion connection portion are connected by insertion, the slanted surface of the insertion connection portion tightly fits the slanted surface of the support tube, and the connection between the insertion connection portion and the support tube becomes tighter with an increasing pressure. The insertion connection portion and the support tube can be fixed without bolts, the structure is simple and the assembly and disassembly can be carried out quickly and conveniently.

2. The insertion connection portion and the connection tube have a pair of slanted surfaces disposed opposite to each other. When the connection tube and the insertion connection portion are connected by insertion, the slanted surface of the insertion connection portion tightly fits the slanted surface of the connection tube, and the connection between the insertion connection portion and the connection tube becomes tighter with an increasing pressure. The insertion connection portion and the connection tube can be fixed without using bolts, the structure is simple, and assembly and disassembly can be carried out quickly and conveniently.

3. The present invention can be provided that the end portion of the beam connects to the connection tube with other way, the insertion connection portion of the beam and the support tube are connected by insertion, or the end portion of the beam connects to the support tube with other way, the insertion connection portion of the beam and the connection tube are connected by insertion, or the end portion of the beam, the support tube and the connection tube are connected by insertion, which can reduce the workload when assembling, and the assembly and disassembly are convenient.

4. The support tube, the insertion connection portion and the connection tube are aligned on a straight line, so gravity can be transferred more smoothly to the ground, and the structure of the bedstead is more stable.

BRIEF DESCRIPTION OF THE DRAWINGS

The present invention will be further described below with reference to the accompanying drawings and embodiments.

DETAILED DESCRIPTION OF THE EMBODIMENT

Figure 1:
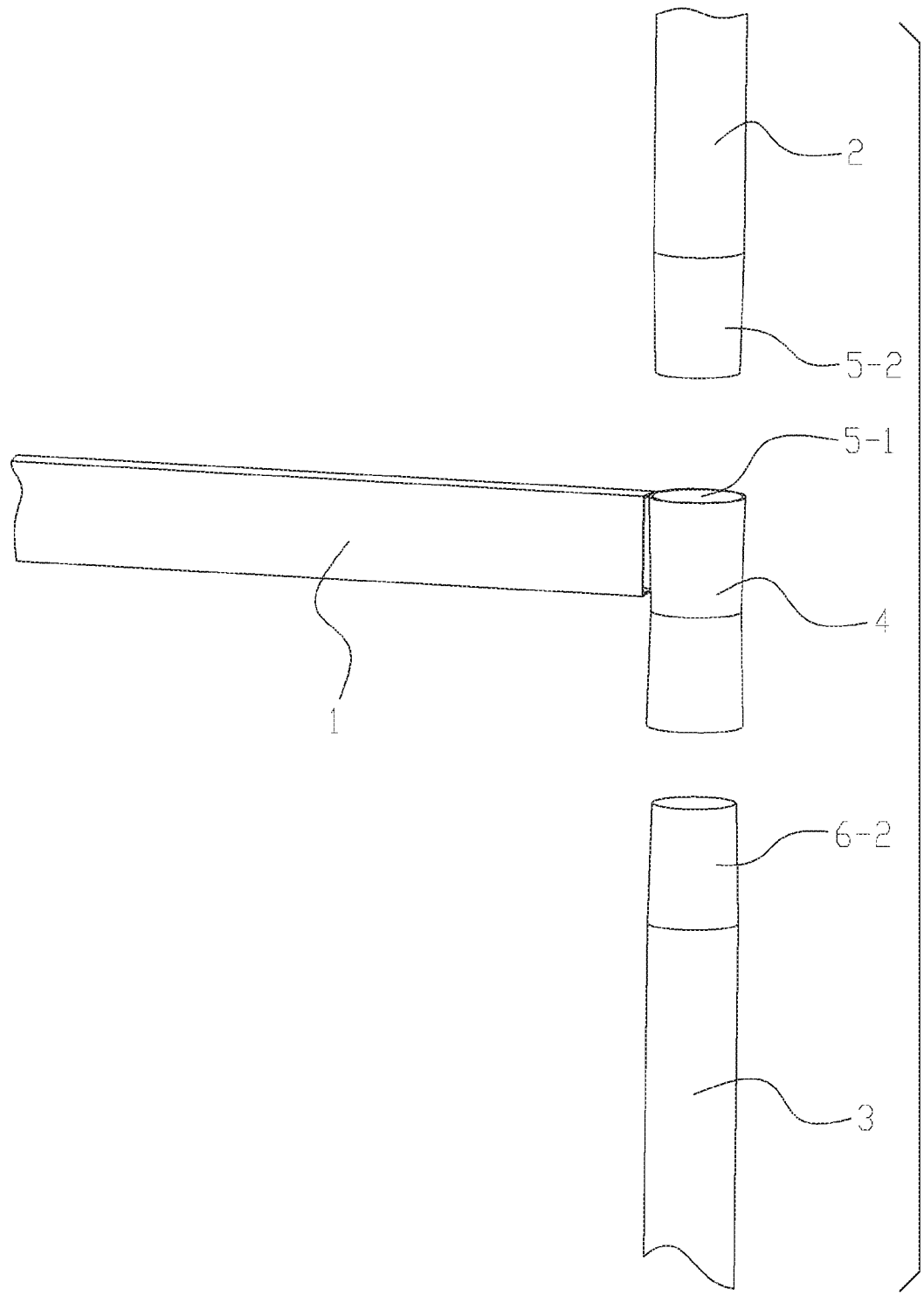
FIG. 1 is an exploded view of the structure for connecting a stand pole and a beam of a bunk bed of the present invention.
Figure 2:
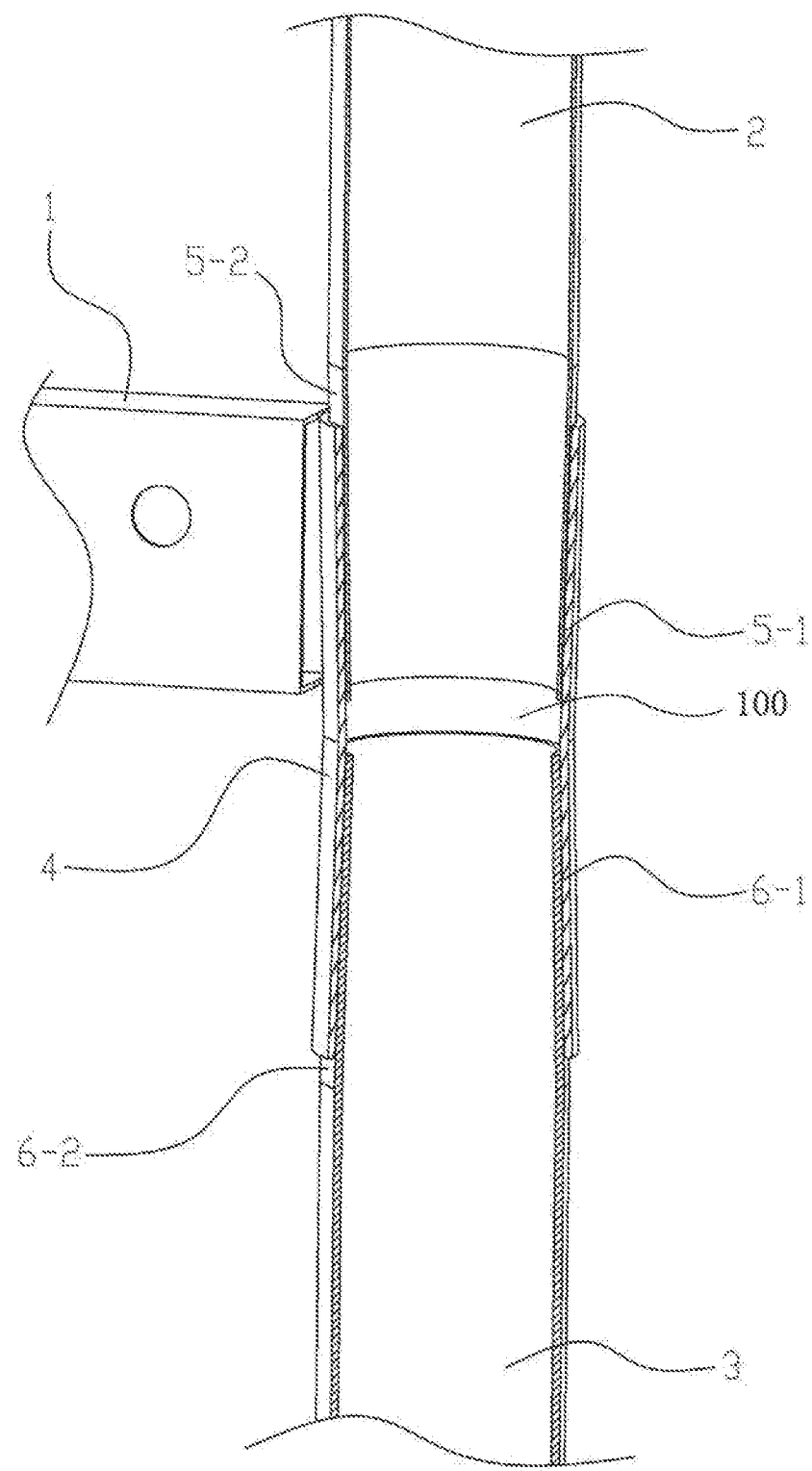
FIG. 2 is a connection diagram of the structure for connecting a stand pole and a beam of a bunk bed shown in FIG. 1.

Referring to FIG. 1 and FIG. 2, a structure for connecting a stand pole and a beam of a bunk bed is provided that the stand pole comprises a support tube 2 and a connection tube 3; the support tube 2 and the connection tube 3 are set vertically. The support tube 2 is located above the beam 1 and the connection tube 3 is located below the beam 1. The beam 1 is set horizontally, an end portion of the beam 1 is disposed with an insertion connection portion 4 used to connect the support tube 2 and the connection tube 3. Preferably, the support tube 2, the insertion connection portion 4 and the connection tube 3 are aligned on a straight line.

Figure 3:
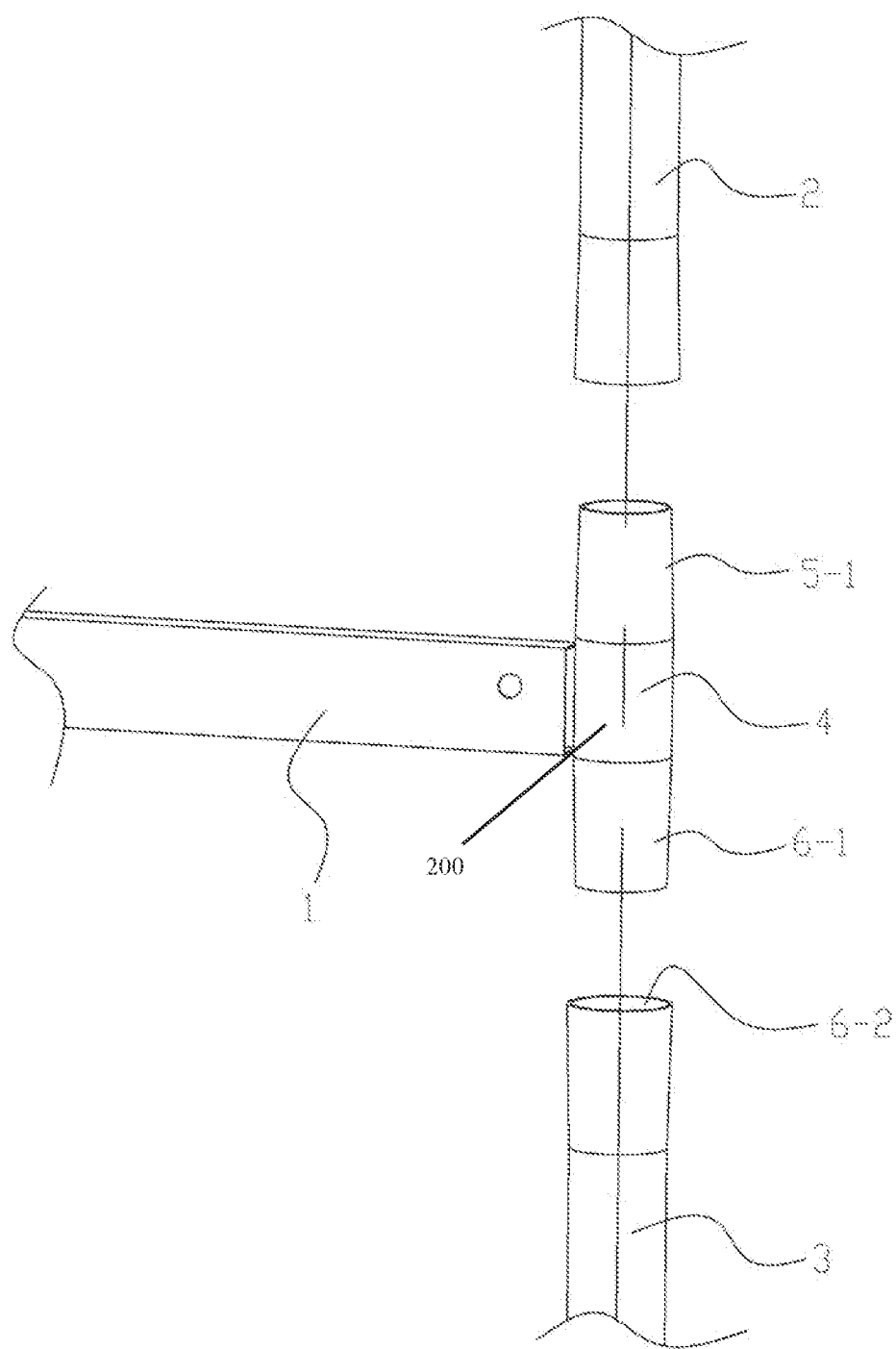
FIG. 3 is a diagram of a first deformation of the structure for connecting a stand pole and a beam of a bunk bed of the present invention.
Figure 4:
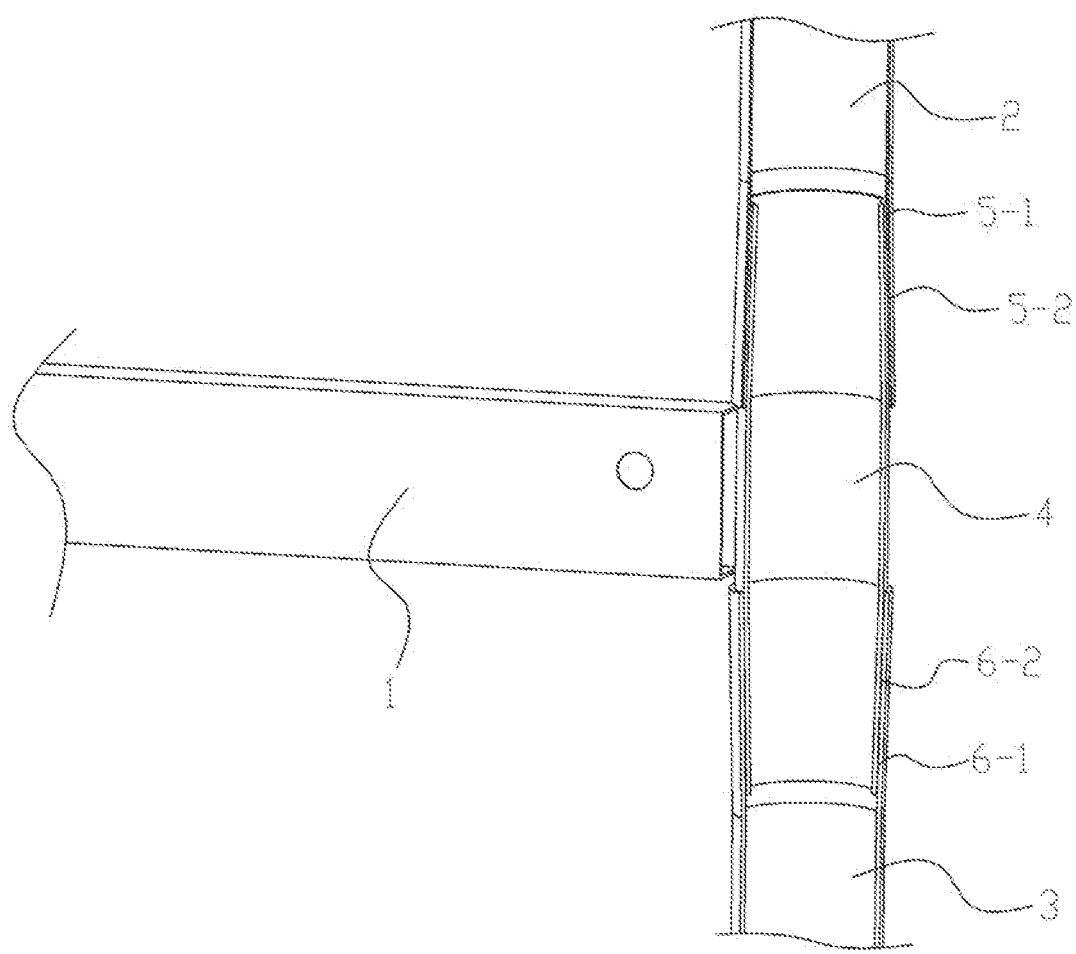
FIG. 4 is a connection diagram of the structure shown in FIG. 3.

The insertion connection portion 4 and the support tube 2 have a pair of slanted surfaces 5-1, 5-2 disposed opposite to each other. When the support tube 2 and the insertion connection portion 4 are connected by insertion, the slanted surface 5-1 of the insertion connection portion 4 tightly fits the slanted surface 5-2 of the support tube 2 to achieve a stable connection between the support tube 2 and the insertion section 4. The slanted surfaces 5-1, 5-2 are conical or pyramidal surface. Preferably, the slanted surface 5-2 is disposed at the lower end of the support tube 2 to form a conical plug (i.e., a first plug), the slanted surface 5-1 is disposed at the upper portion of the insertion connection portion 4 to form a tapered hole (i.e., a first hole), the conical plug and tapered hole are mated together for quick release connection, that is, the support tube 2 inserts into the insertion connection portion 4. Certainly, it can also be shown like FIG. 3 and FIG. 4, the slanted surface 5-2 is disposed at the lower end of the support tube 2 to form a tapered hole, the slanted surface 5-1 is disposed at the upper portion of the insertion connection portion 4 to form a conical plug, that is, the insertion connection portion 4 inserts into the support tube 2, which can also achieve the insertion connection.

Figure 5:
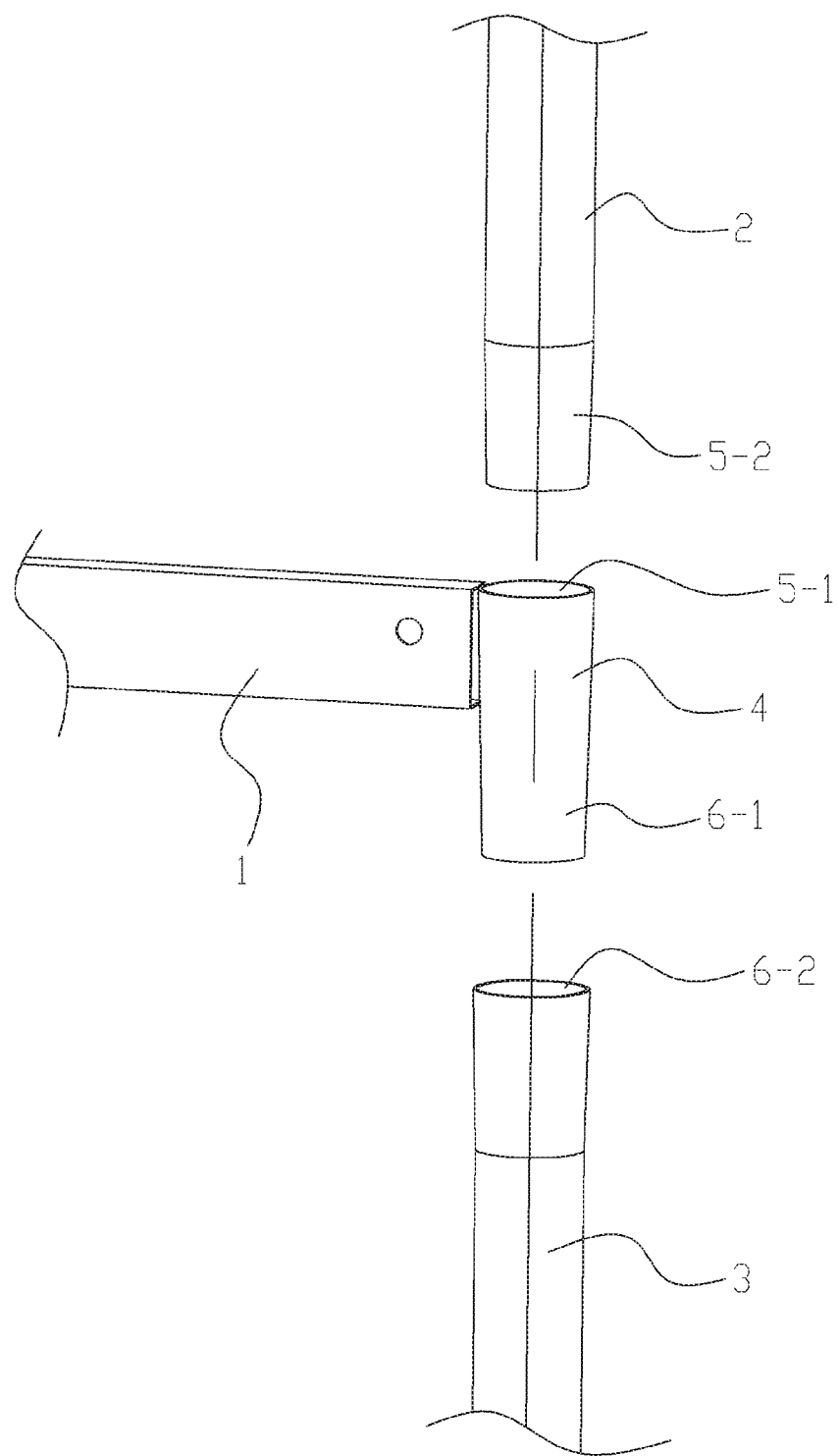
FIG. 5 is a diagram of a second deformation of the structure for connecting a stand pole and a beam of a bunk bed of the present invention.
Figure 6:
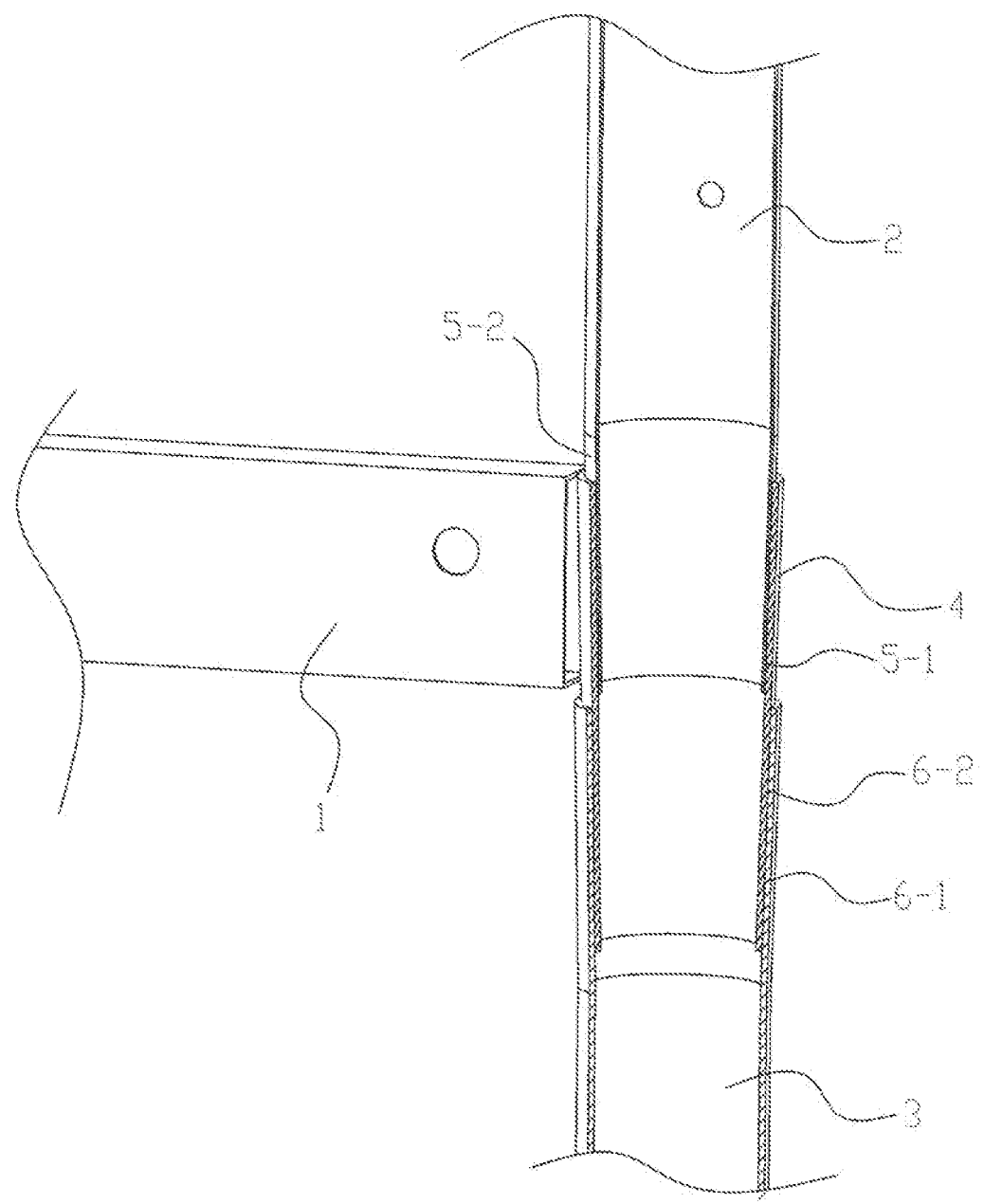
FIG. 6 is a connection diagram of the structure shown in FIG. 5.

The insertion connection portion 4 and the connection tube 3 have a pair of slanted surfaces 6-1, 6-2 disposed opposite to each other. When the connection tube 3 and the insertion connection portion 4 are connected by insertion, the slanted surface 6-1 of the insertion connection portion 4 tightly fits the slanted surface 6-2 of the connection tube 3 to achieve a stable connection between the connection tube 3 and the insertion section 4. The slanted surfaces 6-1, 6-2 are conical or pyramidal surface. Preferably, the slanted surface 6-2 is disposed at the upper end of the connection tube 3 to form a conical plug (i.e., a second plug), the slanted surface 6-1 is disposed at the lower portion of the insertion connection portion 4 to form a tapered hole (i.e., a second hole), the conical plug and tapered hole are mated together for quick release connection, that is, the connection tube 3 inserts into the insertion connection portion 4. The first hole is separated from the second hole by an inner straight wall 100 of the insertion connection portion 4, and a minimum inner diameter of the first hole and a minimum inner diameter of the second hole are greater than an inner diameter of the inner straight wall 100. The first plug is separated from the second plug by an outer straight wall 200 of the insertion connection portion 4, and a minimum outer diameter of the first plug and a minimum outer diameter of the second plug are less than an outer diameter of the outer straight wall 200. Certainly, it can also be shown like FIG. 5 and FIG. 6, the slanted surface 6-2 is disposed at the upper end of the connection tube 3 to form a tapered hole, the slanted surface 6-1 is disposed at the lower portion of the insertion connection portion 4 to form a conical plug, that is, the insertion connection portion 4 inserts into the connection tube 3, which can also achieve the insertion connection.

Two pairs of slanted surfaces 5-1, 5-2 and 6-1, 6-2 can tightly connect the support tube 2, the connection tube 3 and the beam 1 together, which makes the stand pole and beam of the bunk bed be easily disassembled. The slanted surfaces 5-1 and 6-1 are connected with the inner straight wall 100 or the outer straight wall 200. The technicians in this field can only set up the slanted surfaces 5-1, 5-2 between the insertion connection portion 4 and the support tube 2 for easily disassembling, and then other existing connection devices are used to connect the insertion connection portion 4 and the connection tube 3. The technicians in this field can also only set up the slanted surfaces 6-1, 6-2 between the insertion connection portion 4 and the connection tube 3 for easily disassembling, and then other existing connection devices are used to connect the insertion connection portion 4 and the support tube 2.

Figure 7:
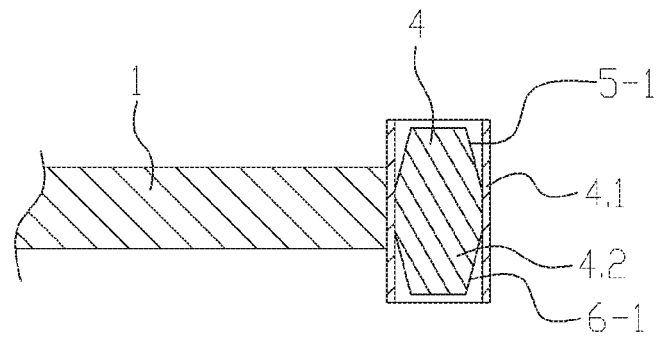
FIG. 7 is a diagram of a third deformation of the insertion connection portion.

In addition, understandably, the insertion connection portion 4 can be an integral element attached to the end of the beam 1, or as shown in FIG. 7, the insertion connection portion 4 consists of a outer part 4.1 and an inner core 4.2, the outer part 4.1 is a hollow pipe structure to envelops the inner core 4.2, which be fixed together by welding or locking. The slanted surface 5-1 is disposed at the upper part of the inner core 4.2, the slanted surface 6-2 is disposed at the lower part of the inner core 4.2, in this way, the support tube 2 and the connection tube 3 can also be connected together.

Figure 8:
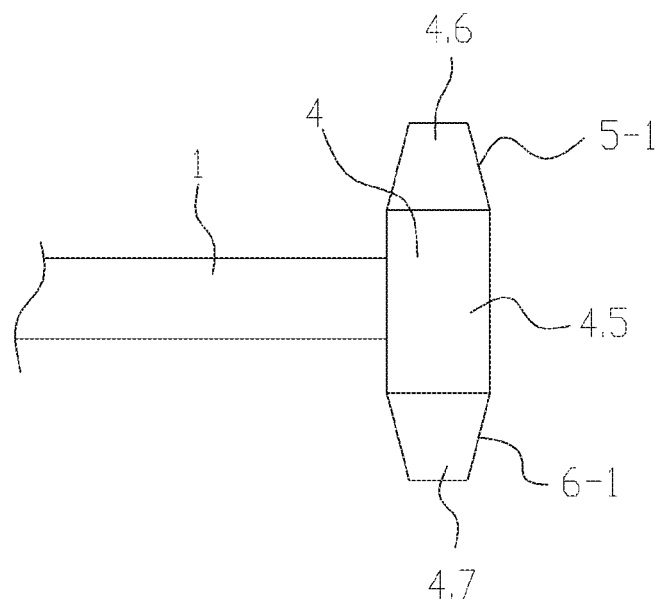
FIG. 8 is a diagram of a fourth deformation of the insertion connection portion.
Figure 9:
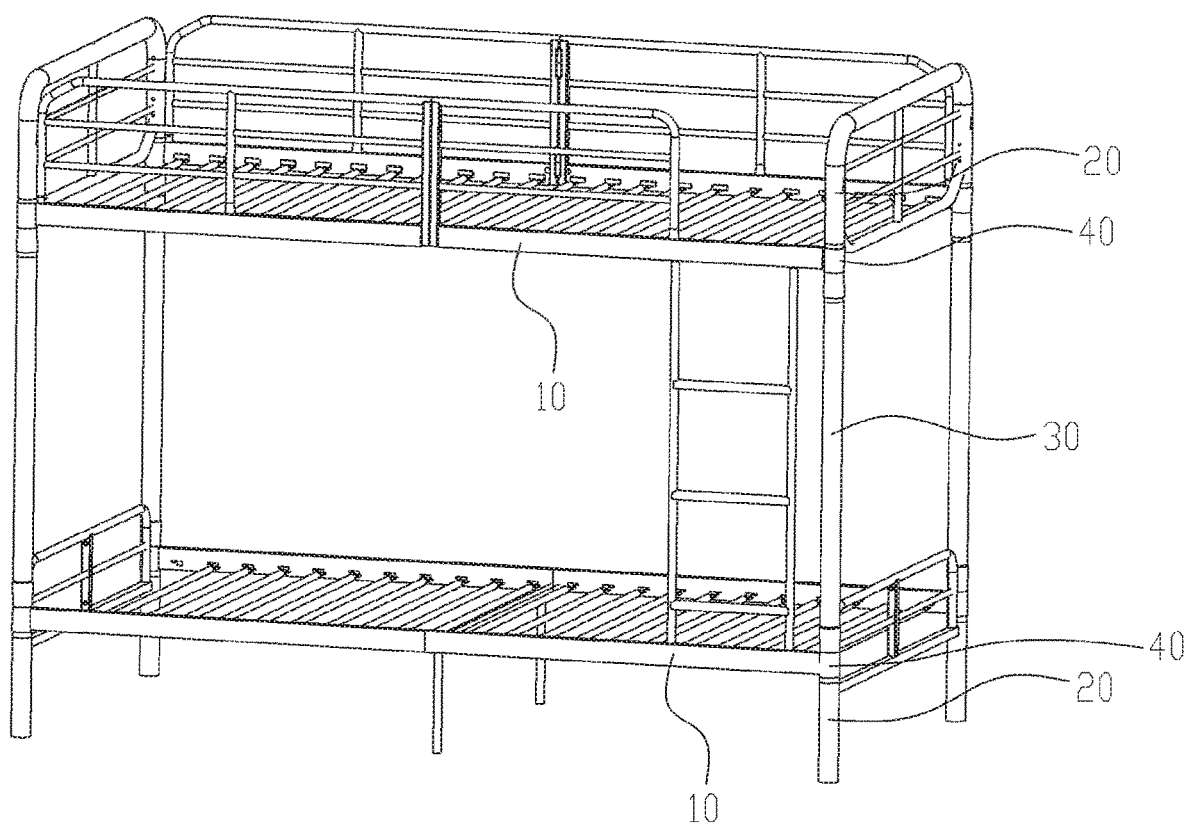
FIG. 9 is a schematic diagram of a bunk bed of the present invention.
Figure 10:
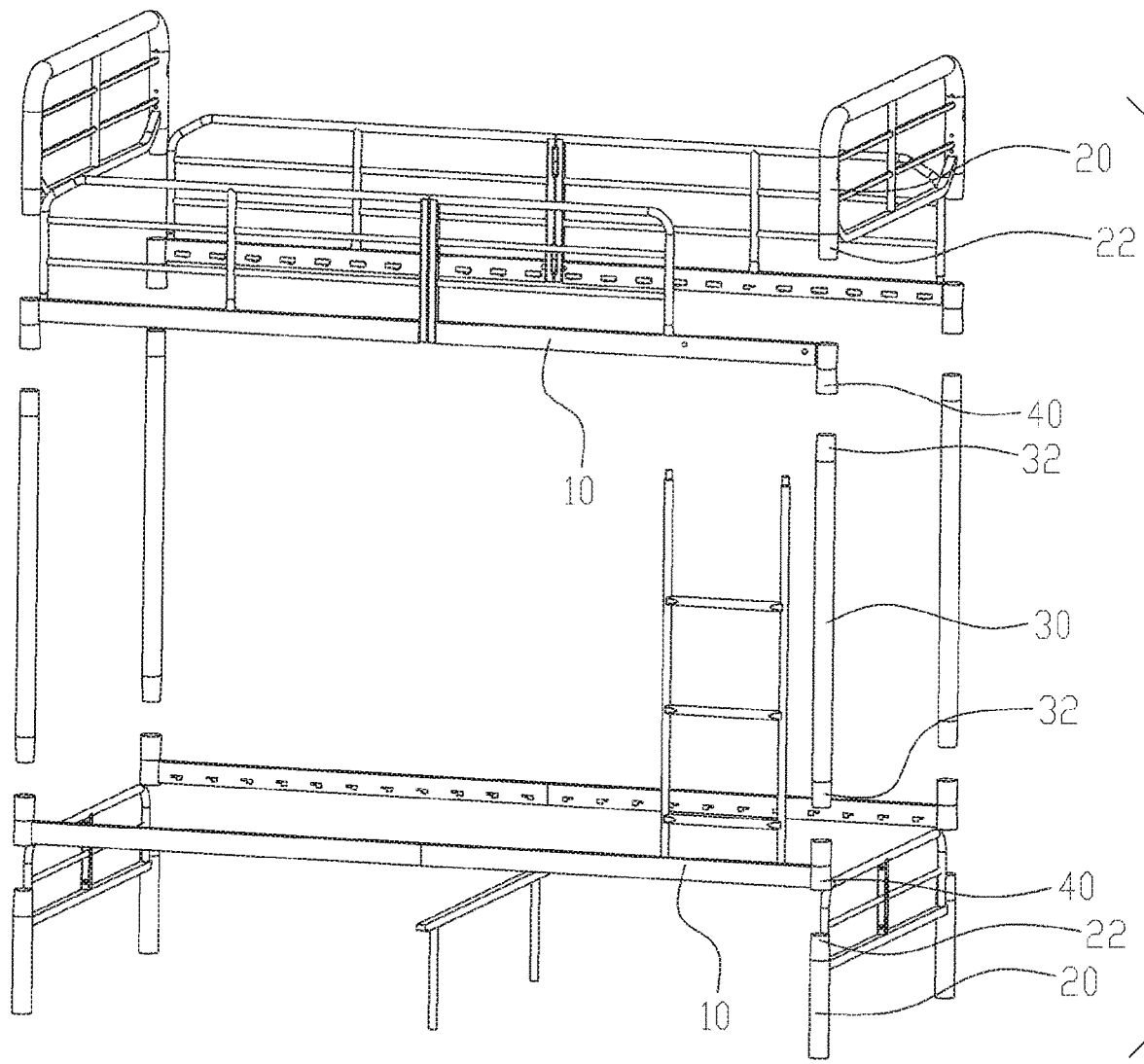
FIG. 10 is an exploded view of the bunk bed of FIG. 9.
Figure 11:
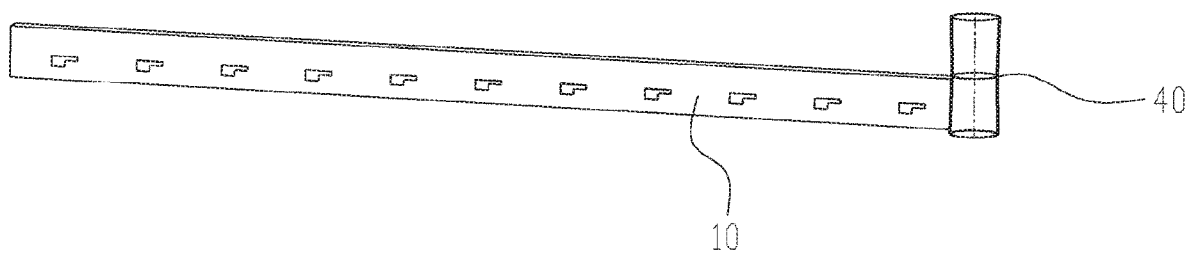
FIG. 11 is a schematic diagram of the lower beam of the bunk bed of FIG. 9.
Figure 12:
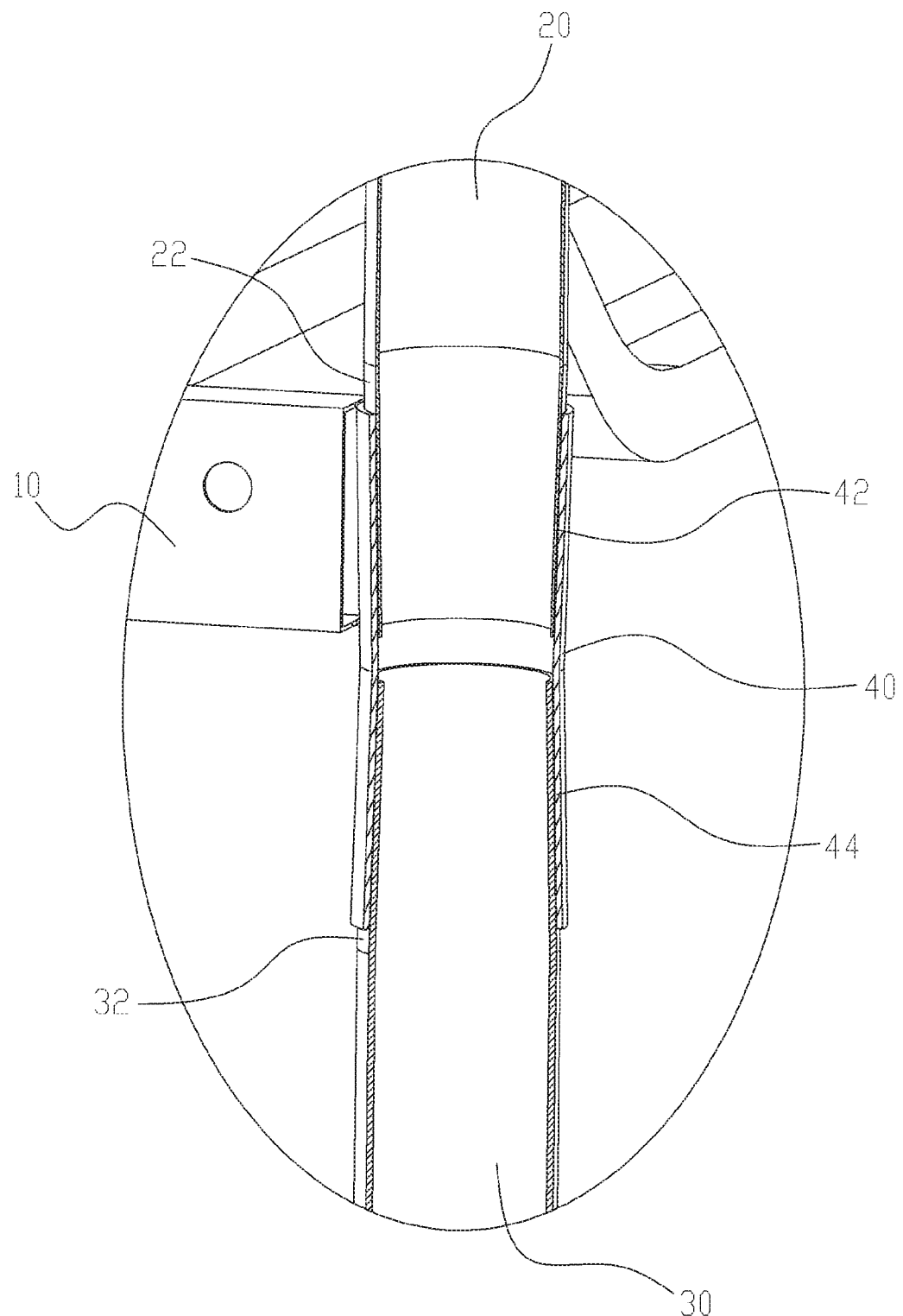
FIG. 12 is a schematic diagram of the structure for connecting the upper beam, the support tube and the connection tube shown in FIG. 9.
Figure 13:
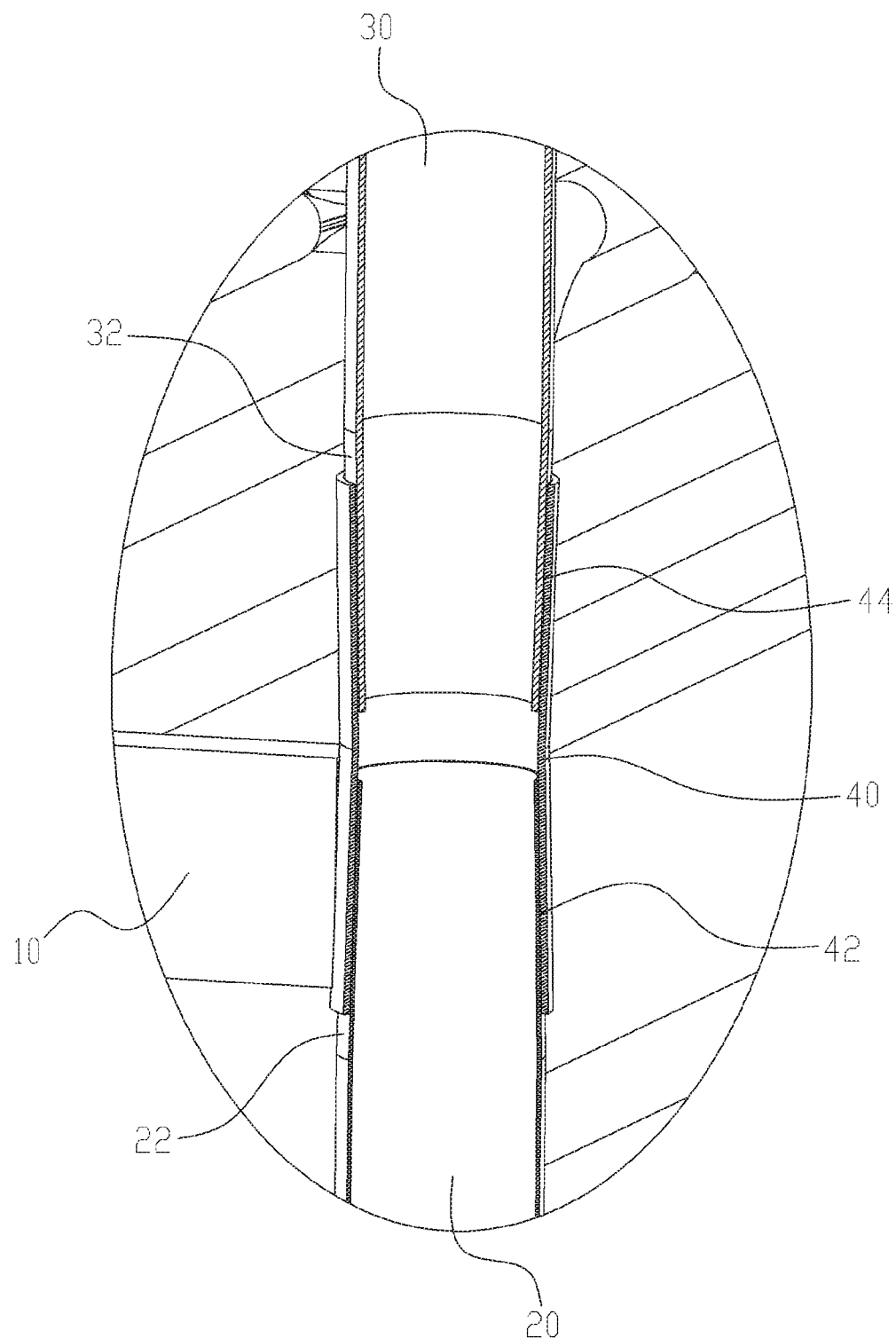
FIG. 13 is a schematic diagram of the structure for connecting the lower beam, the support tube and the connection tube shown in FIG. 9.

In addition, as shown in FIG. 8, the insertion connection portion 4 can also be composed of a main body 4.5, an upper joint 4.6 and a lower joint 4.7. The main body 4.5 is connected to the end of the beam 1, the upper joint 4.6 is connected to the top of the main body 4.5, and the lower joint 4.7 is connected to the bottom of the main body 4.5. The slanted surface 5-1 is arranged on the upper joint 4.6, and the slanted surface 6-2 is arranged at the lower joint 4.7. In this way, the support tube 2 and the connection tube 3 can be connected together.

Referring to FIG. 9 to FIG. 13, the present invention is provided with a bunk bed adopting above-mentioned connection structure. The bunk bed comprises the stand pole and two beams 10. The stand pole comprises a connection tube 30 and two support tubes 20, the two beams 10 are set up and down in parallel, the connection tube 30 and the support tube 20 are set vertically. The support tube 20 is located above the beam 10 and the connection tube 30 is located below the beam 10. The connection tube 30 is located between the two beams 10. An end portion of the beam 10 is disposed with an insertion connection portion 40 used to connect the support tube 20 and the connection tube 30. Preferably, the support tube 20, the insertion connection portion 40 and the connection tube 30 are aligned on a straight line.

The insertion connection portion 40 and the support tube 20 have a pair of slanted surfaces 42, 22 disposed opposite to each other. When the support tube 20 and the insertion connection portion 40 are connected by insertion, the slanted surface 42 of the insertion connection portion 40 tightly fits the slanted surface 22 of the support tube 20 to achieve a stable connection of the support tube 20 and the insertion connection portion 40. The slanted surfaces 42, 22 are conical or pyramidal surface. Preferably, the slanted surface 22 is disposed at the end of the support tube 20 to form a conical plug, the slanted surface 42 is disposed at the insertion connection portion 40 to form a tapered hole, the conical plug and tapered hole are mated together for quick release connection, that is, the support tube 20 inserts into the insertion connection portion 40. Certainly, the slanted surface 22 can also set at the end of the support tube 20 to form a tapered hole, the slanted surface 42 is disposed at the insertion connection portion 40 to form a conical plug, that is, the insertion connection portion 40 inserts into the support tube 20, which can also achieve the insertion connection.

The insertion connection portion 40 and the connection tube 30 have a pair of slanted surfaces 44, 32 disposed opposite to each other. When the connection tube 30 and the insertion connection portion 40 are connected by insertion, the slanted surface 44 of the insertion connection portion 40 tightly fits the slanted surface 32 of the connection tube 30 to achieve a stable connection of the connection tube 30 and the insertion connection portion 40. The slanted surfaces 44, 32 are conical or pyramidal surface. Preferably, the slanted surface 32 is disposed at the end of the connection tube 30 to form a conical plug, the slanted surface 44 is disposed at the insertion connection portion 40 to form a tapered hole, the conical plug and tapered hole are mated together for quick release connection, that is, the connection tube 30 inserts into the insertion connection portion 40. Certainly, the slanted surface 32 can also set at the end of the connection tube 30 to form a tapered hole, the slanted surface 32 is disposed at the insertion connection portion 40 to form a conical plug, that is, the insertion connection portion 40 inserts into the connection tube 30, which can also achieve the insertion connection.

Two pairs of slanted surfaces 42, 22 and 44, 32 can tightly connect the support tube 20, two beams 10 and the connection tube 30 together, which makes the stand pole and the beam of the bunk bed be easily disassembled. The technicians in this field can only use the connecting structure between the upper beam 10, the upper support tube 20 and the connection tube 30, but also can only use the connection structure between the lower beam 10, the lower support tube 20 and the connection tube 30.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with an insertion connection portion at the beam of the bunk bed to connect with the support tube and the connection tube by insertion or to connect with the support tube or the connection tube individually to build the bedstead of the bunk bed. The slanted surface of the insertion connection portion tightly fits the slanted surface of the support tube, and the connection between the insertion connection portion and the support tube becomes tighter with an increasing pressure. The insertion connection portion and the support tube can be fixed without or with less use of bolts. The structure is simple and the assembly and disassembly can be carried out quickly and conveniently.

The invention claimed is:

1. A structure for connecting a stand pole and a beam of a bunk bed, the stand pole comprising:
    a support tube, and
    a connection tube, wherein:
        the support tube is located above the beam,
        the connection tube is located below the beam,
        an end portion of the beam is disposed with an insertion connection portion,
        two ends of the insertion connection portion respectively taper to define a first connection part and a second connection part integrally formed with the insertion connection portion,
        an end of the support tube tapers to define a third connection part integrally formed with the support tube,
        an end of the connection tube tapers to define a fourth connection part integrally formed with the connection tube,
        one of the first connection part or the third connection part tapers inward to define a first plug and the other of the first connection part or the third connection part tapers outward to define a first hole,
the first connection part is directly coupled to the third connection part through the first plug and the first hole,
one of the second connection part or the fourth connection part tapers inward to define a second plug and the other of the second connection part or the fourth connection part tapers outward to define a second hole,
the second connection part is directly coupled to the fourth connection part through the second plug and the second hole,
a sidewall defining the first hole, a sidewall defining the second hole, a sidewall defining the first plug and a sidewall defining the second plug are slanted walls,
the first hole and the second hole define a first set,
the first plug and the second plug define a second set,
one of the first set or the second set is disposed on the insertion connection portion,
the other of the first set or the second set is disposed on the support tube and the connection tube,
the sidewall defining the first hole is parallel to the sidewall defining the first plug,
the sidewall defining the second hole is parallel to the sidewall defining the second plug,
when the first set is disposed on the insertion connection portion:
the first hole and the second hole are respectively and gradually enlarged towards the two ends of the insertion connection portion,
the first hole is separated from the second hole by an inner straight wall of the insertion connection portion, and
a minimum inner diameter of the first hole and a minimum inner diameter of the second hole are greater than an inner diameter of the inner straight wall, when the second set is disposed on the insertion connection portion:
the first plug and the second plug are respectively and gradually narrowed towards the two ends of the insertion connection portion,
the first plug is separated from the second plug by an outer straight wall of the insertion connection portion, and
a minimum outer diameter of the first plug and a minimum outer diameter of the second plug are less than an outer diameter of the outer straight wall,
when the first plug is inserted into the first hole, the first plug is directly connected to the sidewall defining the first hole, and
when the second plug is inserted into the second hole, the second plug is directly connected to the sidewall defining the second hole.

2. The structure for connecting the stand pole and the beam of the bunk bed according to claim 1, wherein the slanted walls are conical structures or pyramidal structures.

3. The structure for connecting the stand pole and the beam of the bunk bed according to claim 1, wherein:
the first plug is disposed at a lower end of the support tube and the first hole is disposed at an upper portion of the insertion connection portion, or
the first hole is disposed at the lower end of the support tube and the first plug is disposed at the upper portion of the insertion connection portion.

4. The structure for connecting the stand pole and the beam of the bunk bed according to claim 1, wherein:
the second plug is disposed at an upper end of the connection tube and the second hole is disposed at a lower portion of the insertion connection portion, or
the second hole is disposed at the upper end of the connection tube and the second plug is disposed at the lower portion of the insertion connection portion.

5. The structure for connecting the stand pole and the beam of the bunk bed according to claim 1, wherein a longest axis of the support tube, a longest axis of the insertion connection portion and a longest axis of the connection tube are collinear.

6. The structure for connecting the stand pole and the beam of the bunk bed according to claim 1, wherein the beam is directly connected to one of the inner straight wall or the outer straight wall.

7. The structure for connecting the stand pole and the beam of the bunk bed according to claim 1, wherein the beam is directly connected to one of the slanted walls.

8. The structure for connecting the stand pole and the beam of the bunk bed according to claim 1, wherein:
the sidewall defining the first hole and the sidewall defining the second hole are exposed to an external environment,
the sidewall defining the first plug defines a first hollow cavity and the sidewall defining the second plug defines a second hollow cavity,
laterally between the external environment and the first hollow cavity, merely the sidewall defining the first hole and the sidewall defining the first plug are present, and
laterally between the external environment and the second hollow cavity, merely the sidewall defining the second hole and the sidewall defining the second plug are present.

9. A bunk bed, comprising:
stand poles, and
beams, wherein:
at least one of the stand poles comprises a connection tube, a first support tube, and a second support tube,
the beams comprise an upper beam and a lower beam,
the first support tube is disposed above the upper beam,
the second support tube is disposed below the lower beam,
the connection tube is disposed between the upper beam and the lower beam,
an end portion of each of the beams is disposed with an insertion connection portion,
the insertion connection portion tapers to define a first connection part and a second connection part integrally formed with the insertion connection portion,
an end of each of the first support tube and the second support tube tapers to define a third connection part,
the end of the first support tube that is tapered to define the third connection part is integrally formed with the first support tube,
the end of the second support tube that is tapered to define the third connection part is integrally formed with the second support tube,
an end of the connection tube tapers to define a fourth connection part integrally formed with the connection tube,
one of the first connection part or the third connection part tapers inward to define a first plug and the other of the first connection part or the third connection part tapers outward to define a first hole, the first connection part is directly coupled to the third connection part through the first plug and the first hole, one of the second connection part or the fourth connection part tapers inward to define a second plug and the other of the second connection part or the fourth connection part tapers outward to define a second hole, the second connection part is coupled to the fourth connection part through the second plug and the second hole, a sidewall defining the first hole, a sidewall defining the second hole, a sidewall defining the first plug and a sidewall defining the second plug are slanted walls, the first hole and the second hole define a first set, the first plug and the second plug define a second set, one of the first set or the second set is disposed on the insertion connection portion, the other of the first set or the second set is disposed on the support tube and the connection tube, the sidewall defining the first hole is parallel to the sidewall defining the first plug, the sidewall defining the second hole is parallel to the sidewall defining the second plug, when the first set is disposed on the insertion connection portion:
- the first hole and the second hole are respectively and gradually enlarged towards two ends of the insertion connection portion,
- the first hole is separated from the second hole by an inner straight wall of the insertion connection portion, and
- a minimum inner diameter of the first hole and a minimum inner diameter of the second hole are greater than an inner diameter of the inner straight wall, when the second set is disposed on the insertion connection portion:
- the first plug and the second plug are respectively and gradually narrowed towards the two ends of the insertion connection portion,
- the first plug is separated from the second plug by an outer straight wall of the insertion connection portion, and
- a minimum outer diameter of the first plug and a minimum outer diameter of the second plug are less than an outer diameter of the outer straight wall, when the first plug is inserted into the first hole, the first plug is directly connected to the sidewall defining the first hole, and when the second plug is inserted into the second hole, the second plug is directly connected to the sidewall defining the second hole.

10. The bunk bed according to claim 9, wherein the slanted walls are conical structures or pyramidal structures.

11. The bunk bed according to claim 9, wherein:
the first plug is disposed at a lower end of the first support tube or the second support tube and the first hole is disposed at an upper portion of the insertion connection portion, or the first hole is disposed at the lower end of the first support tube or the second support tube and the first plug is disposed at the upper portion of the insertion connection portion.

12. The bunk bed according to claim 9, wherein:
the second plug is disposed at an upper end of the connection tube and the second hole is disposed at a lower portion of the insertion connection portion, or the second hole is disposed at the upper end of the connection tube and the second plug is disposed at the lower portion of the insertion connection portion.

13. The bunk bed according to claim 9, wherein a longest axis of the first support tube or the second support tube, a longest axis of the insertion connection portion and a longest axis of the connection tube are collinear.

14. The bunk bed according to claim 9, wherein each of the beams is directly connected to one of the inner straight wall or the outer straight wall.

15. The bunk bed according to claim 9, wherein the each of the beams is directly connected to one of the slanted walls.

16. The bunk bed according to claim 9, wherein:
the sidewall defining the first hole and the sidewall defining the second hole are exposed to an external environment, the sidewall defining the first plug defines a first hollow cavity and the sidewall defining the second plug defines a second hollow cavity, laterally between the external environment and the first hollow cavity, merely the sidewall defining the first hole and the sidewall defining the first plug are present, and laterally between the external environment and the second hollow cavity, merely the sidewall defining the second hole and the sidewall defining the second plug are present.

* * * * *